(12) United States Patent
Yli-Opas et al.

(10) Patent No.: US 12,537,917 B2
(45) Date of Patent: Jan. 27, 2026

(54) ADAPTATION OF THE RADIO CONNECTION BETWEEN A MOBILE DEVICE AND A BASE STATION

(71) Applicant: NOKIA TECHNOLOGIES OY, Espoo (FI)

(72) Inventors: Perttu Pekka Antinpoika Yli-Opas, Espoo (FI); Dani Johannes Korpi, Helsinki (FI); Mikko Aleksi Uusitalo, Helsinki (FI); Mateo Rendon Jaramillo, Espoo (FI)

(73) Assignee: Nokia Technologies Oy, Espoo (FI)

( * ) Notice: Subject to any disclaimer, the term of this patent is extended or adjusted under 35 U.S.C. 154(b) by 116 days.

(21) Appl. No.: 17/309,109

(22) PCT Filed: Oct. 24, 2018

(86) PCT No.: PCT/EP2018/079111
§ 371 (c)(1),
(2) Date: Apr. 23, 2021

(87) PCT Pub. No.: WO2020/083477
PCT Pub. Date: Apr. 30, 2020

(65) Prior Publication Data
US 2022/0028090 A1  Jan. 27, 2022

(51) Int. Cl.
*H04N 7/18* (2006.01)
*G06T 7/246* (2017.01)
(Continued)

(52) U.S. Cl.
CPC ............. *H04N 7/183* (2013.01); *G06T 7/246* (2017.01); *G06V 10/273* (2022.01); *G06V 20/10* (2022.01);
(Continued)

(58) Field of Classification Search
None
See application file for complete search history.

(56) References Cited

U.S. PATENT DOCUMENTS

2001/0044315 A1   11/2001   Aoki et al.
2012/0003979 A1    1/2012   Sugahara
(Continued)

FOREIGN PATENT DOCUMENTS

CN   102077490 A   5/2011
CN   103404045 A   11/2013
(Continued)

OTHER PUBLICATIONS

Office Action for European Application No. 18803868.1, mailed on Sep. 22, 2022, 3 pages.
(Continued)

*Primary Examiner* — Vikkram Bali
(74) *Attorney, Agent, or Firm* — Brake Hughes Bellermann LLP (57) ABSTRACT

An apparatus (60) for a base station (10) comprising an antenna system (11) for transmitting a radio signal with devices (30) located in a beam (12) associated with said antenna system (11); said apparatus comprising detecting means (20) configured to timely capture a dated image of a geographical zone (22) at least partly covering said beam (12); processing means (61) configured to determine at least an object (50) corresponding to said devices (30) within said image and properties of said objects, including at least one property representing the visibility of said object in said dated image; control means (62) configured to adapt the radio connection serving said device (30), according to said at least one property.

20 Claims, 4 Drawing Sheets (51) Int. Cl.
   *G06V 10/26*   (2022.01)
   *G06V 20/10*   (2022.01)
   *H04W 36/30*   (2009.01)

(52) U.S. Cl.
   CPC ... *H04W 36/30* (2013.01); *G06T 2207/10016* (2013.01); *G06T 2207/20084* (2013.01)

(56) References Cited

U.S. PATENT DOCUMENTS

| | | |
|---|---|---|
| 2017/0077736 A1 | 3/2017 | Leabman |
| 2017/0077764 A1 | 3/2017 | Bell et al. |
| 2017/0188286 A1 | 6/2017 | Yonekura et al. |
| 2018/0284217 A1 | 10/2018 | Takeuchi |
| 2020/0120458 A1* | 4/2020 | Aldana .................. H04W 4/80 |

FOREIGN PATENT DOCUMENTS

| | | | |
|---|---|---|---|
| CN | 107211289 A | 9/2017 | |
| JP | 2013051570 A | 3/2013 | |
| WO | WO-2019040077 A1 * | 2/2019 | ......... G06K 9/00221 |

OTHER PUBLICATIONS

International Search Report and Written Opinion for International Application No. PCT/EP2018/079111, mailed on Jul. 2, 2019, 12 pages.
Office Action and Search Report for Chinese Application No. 201880100453.8, mailed on Dec. 25, 2023, 11 pages.
Communication pursuant to Article 94(3) EPC for European Application No. 18803868.1, mailed Jun. 4, 2024, 5 pages.

\* cited by examiner

ADAPTATION OF THE RADIO CONNECTION BETWEEN A MOBILE DEVICE AND A BASE STATION

CROSS-REFERENCE TO RELATED APPLICATIONS

This application is a national stage entry of International Application No. PCT/EP2018/079111, filed Oct. 24, 2018, entitled "ADAPTATION OF THE RADIO CONNECTION BETWEEN A MOBILE DEVICE AND A BASE STATION" which is hereby incorporated by reference in its entirety.

TECHNICAL FIELD

Various example embodiments relate generally to methods and apparatus for transmitting a radio signal between a base station and devices within a wireless telecommunication network, with improved performances.

BACKGROUND

New wireless telecommunication systems imply strong requirements in terms, notably, of latency and reliability. This is for instance the case with the "Ultra-Reliable and Low-Latency Communications" (URLLC) defined by the 3GPP standards organization for the $5^{th}$ generation (5G) telecommunications networks.

Achieving the stringent quality requirements calls for a significant amount of resources, such as, for instance, a large number of base stations, high transmission power, wide transmission bandwidth, etc. so as to ensure the required quality even under the worst circumstances.

Some proposals have been made to address the need of a tradeoff between the quality requirements and the amount of resources to be deployed. The 3GPP standards propose notably to adapt the transmission power or other radio parameters by reacting to the feedback provided by the recipients.

However, it is likely that such reactive solutions are insufficient in some situations, e.g. in guaranteeing URLLC level service to the recipients.

SUMMARY

In one embodiment, an apparatus for a base station comprises an antenna system for transmitting a radio signal with devices located in a beam associated with said antenna system; said apparatus comprising
  detecting means configured to timely capture a dated image of a geographical zone at least partly covering said beam;
  processing means configured to determine at least an object corresponding to said devices within said image and properties of said objects, including at least one property representing the visibility of said object in said dated image;
  control means configured to adapt the radio connection serving said device, according to said at least one property.

Some embodiments comprise one or more of the following features, which can be taken separately or together, either in partial combination or in full combination:
  said detecting means comprise at least one video camera capturing a video sequence comprising said dated images;
  said detecting means comprise a detector configured to capture a sequence of dated thermal images;
  a camera is associated to each antenna of said antenna system, wherein each of said camera is placed and oriented so that they together cover said geographical zone;
  said processing means are configured to determine said object by detecting a correlation in time between an appearance of said object into said geographical zone and a handover of said device to said base station;
  said processing means are configured to locate an antenna within said object, and to determine a property representing the visibility of said antenna;
  said processing means are configured to compare at least one property of said object between said dated image and a previously-captured dated image; and
  said control means are configured to adapt said radio connection according to this comparison;
  said processing means are configured to determine a property representative of a visibility of said object in said dated image;
  said processing means are further configured to determine a bounding box encapsulating said objects; and to determine at least a part of said properties on the basis of said bounding box;
  said processing means are configured to determine properties among a surface area;
  said processing means are further configured to predict a probable trajectory of said object and a property indicating a probable time at which said object would become not visible, and to trigger said control means to adapt the radio connection at a predetermined offset before said probable time;
  said control means are configured to adapt the radio connection by selecting at least one of adapting the radio power of said base station for transmitting said radio signal, adapting the coding rate, adapting the modulation order of the transmitted data packets, initiating a handover for said device to another base station or to a device-to-device communication link, resorting proactively to blind retransmission;
  the processing and control means comprises at least one processor; and at least one memory including computer program code, the at least one memory and computer program code configured to, with the at least one processor, cause the performance of the apparatus.

According to embodiments of the invention, an apparatus for a base station comprises an antenna system for transmitting a radio signal with devices located in a beam associated with said antenna system; said apparatus being configured to:
  timely capture a dated image of a geographical zone at least partly covering said beam;
  determine at least an object corresponding to said devices within said image and properties of said objects including at least one property representing the visibility of said object in said dated image;
  adapt the radio connection serving said device according to said at least one property.

According to embodiments of the invention, a base station comprises an antenna system for transmitting a radio signal with devices located in a beam associated with said antenna system; and
  interfacing means configured to receive a dated image of a geographical zone at least partly covering said beam;
  processing means configured to determine at least an object corresponding to said devices within said image and properties of said objects, including at least one property representing the visibility of said object in said dated image;

control means configured to adapt the radio connection serving said device according to said at least one property.

According to embodiments of the invention, a system comprises a base station as previously defined and detecting means configured to timely capture a dated image of a geographical zone at least partly covering said beam and transmit said dated image to said base station through said interfacing means.

According to embodiments of the invention, a method for controlling a base station comprising an antenna system for transmitting a radio signal with devices located in a beam associated with said antenna system; said method comprising iterative steps comprises:

a first step for timely capturing a dated image of a geographical zone at least partly covering said beam;

a second step for determining at least an object corresponding to said devices within said image a third step for determining properties of said objects, including at least one property representing the visibility of said object in said dated image;

a fourth step for adapting the radio connection serving said device according to said at least one property.

Some embodiments comprise one or more of the following features, which can be taken separately or together, either in partial combination or in full combination:

said dated images are issued from a video sequence captured by at least one video camera;

said dated images are dated thermal images;

said objects are determined by detecting a correlation in time between an appearance of said object into said geographical zone and a handover of said device to said base station;

the method comprises the determination of a location of an antenna within said object, and the determination of a property representing the visibility of said antenna;

said third step comprises the comparison of at least one property of said object between said dated image and a previously-captured dated image; and, said fourth step comprises adapting said radio connection according to said comparison;

said third step comprises determining a property representative of a visibility of said object in said dated image;

said third step comprises the determination of a bounding box encapsulating said objects; and of at least a part of said properties on the basis of said bounding box; properties comprise a surface area and an aspect ratio of said bounding box;

said third step further comprises the prediction of a probable trajectory of said object and a property indicating a probable time at which said object would become not visible, and the triggering of the adaptation of the radio connection at a predetermined offset before said probable time;

adapting the radio connection comprises selecting at least one of adapting the radio power of said base station for transmitting said radio signal, adapting the coding rate, adapting the modulation order of the transmitted data packets, initiating a handover for said device to another base station or to a device-to-device communication link, resorting proactively to blind retransmission;

According to embodiments of the invention, a computer readable storage medium storing instructions which, when executed by a computer, cause the computer to perform a method as previously defined.

Further features and advantages of the invention will appear from the following description of embodiments of the invention, given as non-limiting examples, with reference to the accompanying drawings listed hereunder.

BRIEF DESCRIPTION OF THE DRAWINGS

Example embodiments will now be described with reference to the accompanying drawings, in which.

DETAILED DESCRIPTION

Example embodiments will now be described. In the following, functional blocks denoted as "means configured to perform . . . " (a certain function) shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

In current cellular systems, resource management in terms of transmission power and coding rate is handled by link adaptation and transmit power control mechanisms, which rely on feedback provided by the recipient, as for instance defined in 3GPP TS36.213 (V15.1.0, Release 15) standards document. The feedback data is typically a quantity or an indicator describing observations of the path loss or the quality of the radio channel.

However, such observations reveal information from the past. As the situation is dynamic (mobile devices may be moving, as well as other elements in their surroundings), the information from the past is not sufficient to assess the situation for the current time or for the future. For this reason, such reactive link adaptation techniques leave room for improvement when dealing with sudden changes, especially if operating under stringent QoS requirements like URLLC.

According to aspects of the invention, detecting means are provided to capture an image of the scene at a given time. Its content can be analyzed so as to anticipate any changes in the radio transmission characteristics and eventually provide a proactive adaptation of the radio connection.

Figure 1:
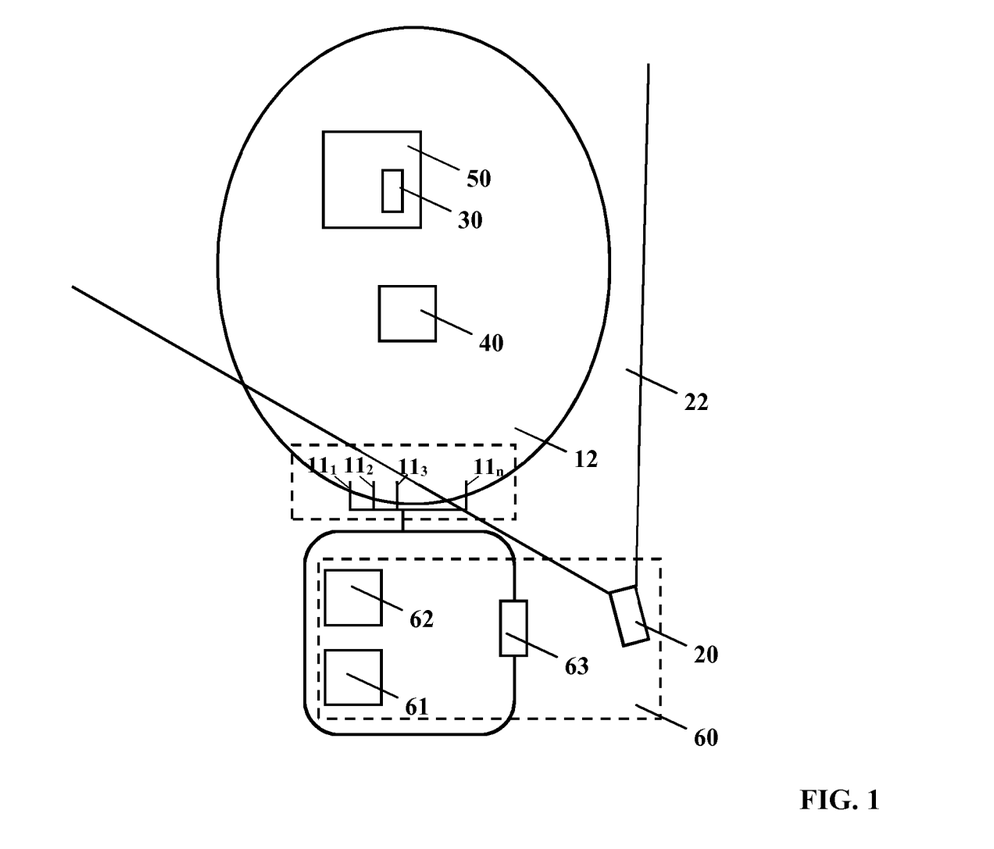
FIG. 1 illustrates an example of overall arrangement according to embodiments of the invention.

An arrangement according to embodiments of the invention is depicted in FIG. 1.

An apparatus 60 is provided in association with a base station 10. The base station comprises an antenna system 11 for transmitting a radio signal to devices 30 located in a beam 12 associated with this antenna system. According to embodiments, the antenna system 11 can consist of an individual directional sector antenna or a multi-antenna system comprising n antennas $11_1, 11_2, 11_3 \ldots 11_n$. In the latter case, the antenna system 11 is arranged so as to form a beam aggregating the beams of all antennas of the multi-antenna system.

Detecting means 20 are further provided for timely capturing a dated image of a geographical zone 22, at least partly convening this beam 12. Preferably, the whole radio beam should be included inside this geographical zone 22.

The term "timely" means along the time several images are captured and dated (e.g. with a time stamp). As we will see the process can be iterative, so that an image is captured at each iteration. The iteration may be periodic or not, depending on implementations.

According to embodiments of the invention, the detecting means can be included into the same box than the base station 10, or deported outside of the base station 10. They should anyhow be located and oriented so as to capture substantially the whole radio beam 12, and be connected with the base station so that control commands and information can be exchanged. In particular, the detecting means and the base station should be co-located or in a close vicinity so that the geographical area covered by the detecting means and the radio beam vastly matches and are similarly oriented. Thanks to such an arrangement, the detecting means capture an image from substantially the "point of view" of the base station and the captured images can be correlated with the radio conditions at the base station.

The detecting means can be embodied by various types of detectors (or sensors). The detectors, or sensors, aim in getting an instant image of the geographical zone 22. Although the process of getting an instant image may require some time, due to physical and data processing constraints, this time can be considered as negligible compared to the radio operations. Then, a date can be assigned to the captured image, which represents the state or situation within the geographical zone at this date.

According to embodiments of the invention, the detecting means comprise a video camera, e.g. working in the visual spectrum. The camera continuously captures the scene within the geographical zone 22. A sample of the video frames can be retrieved to constitute the dated images used for further analysis, according to a configurable periodicity.

The periodicity can be tailored depending on the adopted use-case. For low mobility, the rate of new images can be as little as 24 Hz (the frame rate of legacy video cameras). If fast objects are expected in the geographical area, higher rates should be used. It is also possible to adapt the rate or periodicity depending on the velocities of the detected objects.

According to embodiments of the invention, a camera is associated to each antenna $11_1, 11_2, 11_3 \ldots 11_n$ of the antenna system 11. In other embodiments, a single wide-angle camera is associated to the antenna system 11 for covering the radio beam 12 (or substantial part of it). Various other arrangements can be also designed so as to have the detecting means covering at least partly the beam 12 of the antenna system 11.

According to embodiments of the invention, the detecting means 20 comprise thermal detectors like, for instance, infra-red cameras. This allows capturing images of the geographical zone 22 even during night or under obscure weather conditions. According to embodiments, the thermal detectors may be combined with other detecting means like video cameras working in visual spectrum, so as to provide dated images aggregating heterogeneous sources of information for better robustness.

Other type of detecting means are possible. According to aspects of the invention, the invention allows to combine the radio system operation of the base system with non-radio information related to the beam area, e.g. visual information, thermal information, which capture the real-time situation over the beam area.

As already mentioned, the images captured by the detecting means are dated, i.e. the captured images provided to the processing means 61 may be associated with a date and a time stamp.

Figure 2:
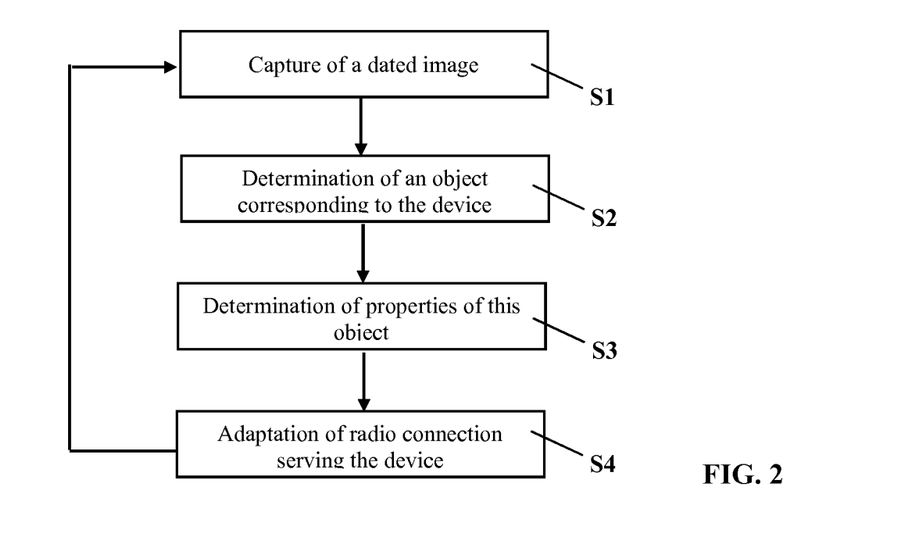
FIG. 2 shows an example of organigram according to some embodiments of the invention.

FIG. 2 shows that, according to some aspects, an iterative process is put in place, wherein a step S1 of capturing the dated image is performed at each iteration.

Figure 6A:
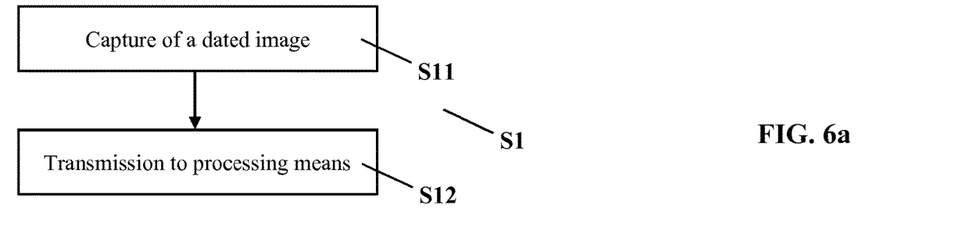

As depicted on FIG. 6a, this step can be embodied with a first sub-step S11 comprising the actual capture of the dated image, and a second sub-step S12 comprising the transmission of the dated image(s) to the processing means 61.

These processing means may be incorporated inside the base station 10. In such case, interfacing means 63 are provided enabling the base station 10 to receive the dated images from the detecting means (camera, thermal sensor, etc.)

According to other embodiments, they may be deported in a separate device with computing means and linked with the base station 10 through interfacing means 63 enabling the base station to receive control commands from the separate device.

Figure 6B:
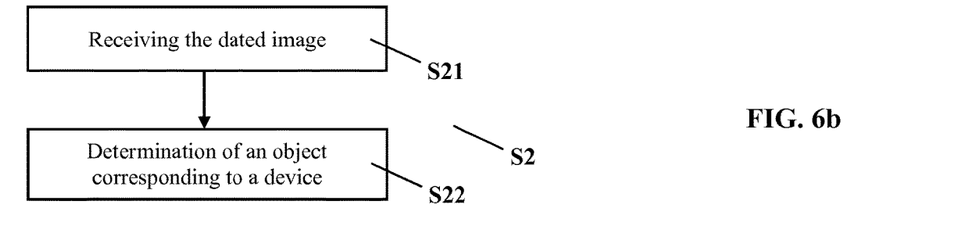

These processing means 61 are configured to perform a step S2 of determination of an object 50 corresponding to the device 30 within the dated image. As depicted on FIG. 6b, this step S2 may be embodied by a first sub-step S21 comprising the reception of the dated image from the detecting means 20, and a second sub-step S22 comprising the determining of the object corresponding to a device.

This latter step aims at establishing a mapping between the information provided by the dated image and the radio system operations. In particular, a mapping is to be done between the content of the dated images, which may represent objects 50, and the devices 30 that the base station 10 is aware of through the radio operations.

According to embodiments of the invention, this mapping can be done by detecting a correlation in time between an appearance of an object 50 into the geographical zone 22 and a handover of a device 30 to the base station 10. If these two events are sufficiently close to each other (i.e. have a strong correlation level), it is likely that they represent a same entity. After this, the object's association with a particular device may be maintained by a visual tracking algorithm Accordingly, the device 30 may be the object 50, or inside the object 50. The object may for instance be a vehicle (car, bus . . . ), or a pedestrian, so that the device itself is not visible, but in the context of the invention, it may be sufficient to assign the device 30 to an associated object 50.

According to embodiments, the two events may be considered as sufficiently close if they are distant by a duration below a predetermined threshold. It may also be possible to take into account the time distance to other events. For instance, if handover to the base station can be considered close to only one appearance of objects into the geographical zone, then the threshold may be larger. Conversely, if the handover may be considered close to the appearances of two objects, then the correlation criteria may be tougher (i.e. shorter threshold) so as to discriminate between the two objects and select the more probable one.

According to embodiments of the invention, it may happen that the locations of the devices are known in advance. It may be the case of devices attached to a particular location, like a building, a crane in a harbor, etc. Then, their locations inside the dated images can be calculated and the mapping to the objects 50 can be directly established.

In a step S3, the processing means 61 may determine properties of the object, or objects, determined at the previous step S2. The determined property, or set of properties, may be representative of an ongoing impact on the radio transmission between the device 30 associated to this object and the base station. Typically, such properties may be representative of a loss of LOS ("Line of Sight").

Figure 6C:
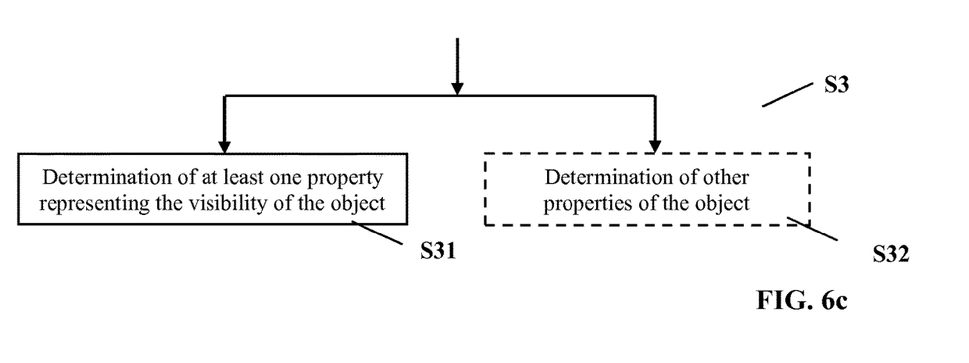
Figure 6D:
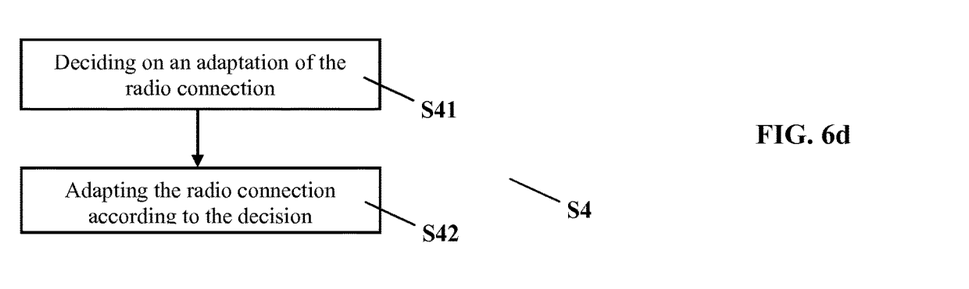

Some control means 62 are provided to then adapt the radio connection serving the devices 30, according to these properties In particular, as depicted in FIG. 6c, a first sub-step S31 may comprise the determination a property representing the visibility of the object in the dated image; and a second sub-step S32 comprising the determination of other properties of the object. These sub-steps may performed in sequence, in parallel or altogether (i.e. the properties are determined in a same process, including the one(s) representing the visibility of the object). According to embodiments of the invention, the sole susbstep S31 may be sufficient, so as only properties representing the visibility of the object are determined.

According to aspects of the invention, just determining the visibility of an object in the image is enough to derive consequences on the radio transmission because of the correlation between the positions and orientations of the detecting means and of the base station. In other words, there is no need to process the image to derive from it a representation of the 3D scenes so as to determine the line of sights between the base stations and the devices, but rather the dated image (i.e. 2D data) can be directly used to check the visibility of the objects and derive from that information about the future radio conditions at the base station. Such a process is both very efficient in terms of computing requirements and provides good and precise results.

In consequence, the dated image can be used directly, without any need to determine the relative positions of the objects, UE and base station for deriving the lines of sights (LOS) and potential occlusions, i.e. NLOS (non-line of sight).

Non line of Sight refers to the path of propagation of a radio frequency that is obscured (partially or completely) by obstacle, thus making it difficult for the radio signal to pass through. While some obstacles absorb and others reflect the radio signal, they all limit the transmission ability of radio signals. Obstacles may include buildings, trees, physical landscape elements (hills . . . ), etc.

According to embodiments of the invention, these properties may be such that predictions can be made based on them without explicitly knowing or calculating the objects' or devices' positions.

Figure 3:
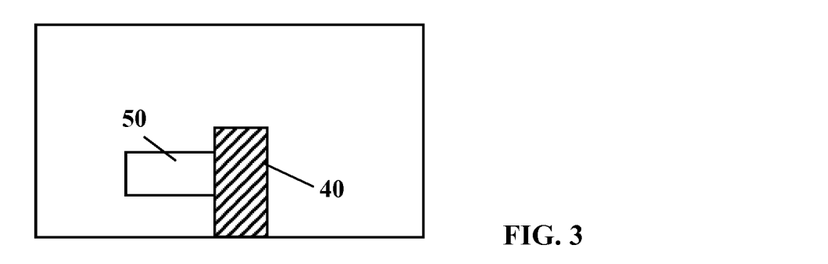
FIG. 3 illustrates an example of a dated image according to embodiments of the invention.

FIG. 3 shows an example for such dated images, wherein an object 50 is partly obscured by a building 40.

It may be possible to derive the fact that the object is partly obscured by trying to map the visible part onto some typical templates (cars, buses, etc.). The results of a correlation may show high level for a region corresponding to the visible part of the template, and low or null level for the hidden part of the template. Such a situation may be considered as typical of a partial visibility of an object.

According to embodiments of the invention, the processing means considers an evolution between a dated image and a previously-captured dated image, i.e. an image captured at a previous iteration, typically the previous iteration.

The processing means may then compare at least one property of the object between 2 successive images.

For instance, the shape of the object may be compared. The diminution of the surface of its shape may represent an object which is gradually hidden behind an obstacle.

Another example of property which can be compared may be a tag identifying an object as "visible", "not visible" or "partly visible". More tags may be configured so as to get a more fine-grained assessment.

The evolution of one property, or a set of properties, between 2 images allows to capture a probable evolution of the object. With regard to the situation of FIG. 3, for example, it allows to discriminate between a first situation wherein the object 50 moves from right to left and is gradually hidden by the obstacle 40, leading to a possible loss of radio connection, and a second situation wherein the object 50 moves from left to right and becomes gradually more visible.

According to embodiments of the invention, the shape of the object can be retrieved in different ways. One possibility is to use the visual shape of the objects, by methods like "Mask R CNN", which can recognize the pixels which belongs to the detected object, but other techniques of feature recognition and image segmentation may also be used.

The "Mask R-CNN" method is for instance described in the paper of Kaiming He, Georgia Gkioxari, Piotr Dollar and Ross Girshick, arXiv:1703.06870, March 2017.

An example algorithm can then be presented here-below. The function "maintain_link_quality" corresponds to one iteration of the previously-described steps S1-S4. In other words, this function may be called at each iteration.

```
def maintain_link_quality(users, snapshot, previous scene):
    scene=detect_objects(snapshot)
    for device in users
        state_now=scene(device)
        state_previous=previous_scene(device)
        if state_now is partially_visible and state_prev is visible
            adapt_transmission_power_up
        if state_now is visible and state_prev is partially_visible
            adapt_transmission_power_down
    return scene;
```

The calling function may store the returned "scene" data structure and pass it as "previous scene" for the next call.

The functions adapt_transmission_power_up and adapt_transmission_power_down aim in adapting the radio transmission power according to the situation. As it will be seen later, several embodiments may be possible to adapt the transmission power towards the device. It is also possible to execute a different function and adjust some other radio parameter than transmit power if that is more suitable for the prevailing conditions.

According to embodiments of the invention, it can be possible to detect an evolution between two scenes, as captured by two dated images, so as to immediately and proactively react by adapting the radio connection serving the device, even before some impact on the current radio operation can be sensed.

According to embodiments of the invention, in order to facilitate the tracking of an object from one image to another and to reduce the computing requirements, bounding boxes can be used as an alternative technique for detecting if an object is entering behind an obstacle.

Bounding box is a concept well known in the art, which can be defined in digital image processing, as merely the coordinates of the rectangular border that fully encloses a digital image when it is placed over a page, a canvas, a screen or other similar bidimensional background. Further explanations can be easily found in the literature, and, for instance, in:
  https://en.wikipedia.org/wiki/Minimum_bounding_box;
    or
  https://computersciencewiki.org/index.php/Bounding_boxes Using bounding boxes makes easier the tracking of an object from one dated image to a subsequent dated image, and also to determine the behavior of the encapsulate object along the dated image. For instance, from a bounding box some properties can be derived which allows comparisons between images of a sequence with low computing costs.

Examples of such parameters may be the surface area of the bounding box (which, being a rectangle, requires very little computing resource for its determination), and/or an aspect ratio.

If a bounding box of an object is decreasing in size, it is likely getting covered by another object. On the contrary, if a bounding box of an object is increasing in size, it is likely that the object becomes more visible.

Figure 4A:
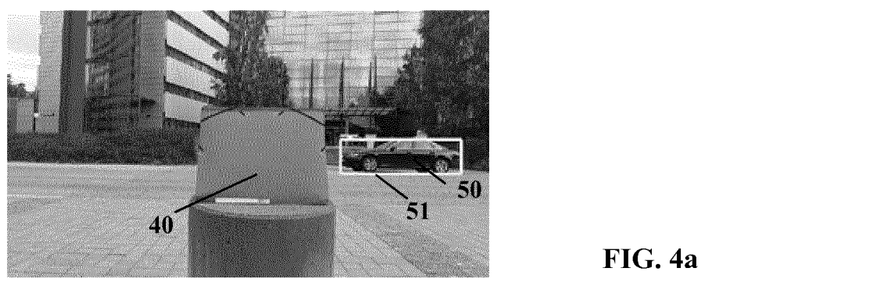
FIGS. 4a, 4b, 4c show 3 examples of images, taken in different dates, of a same scene, according to embodiments of the invention.
Figure 4B:
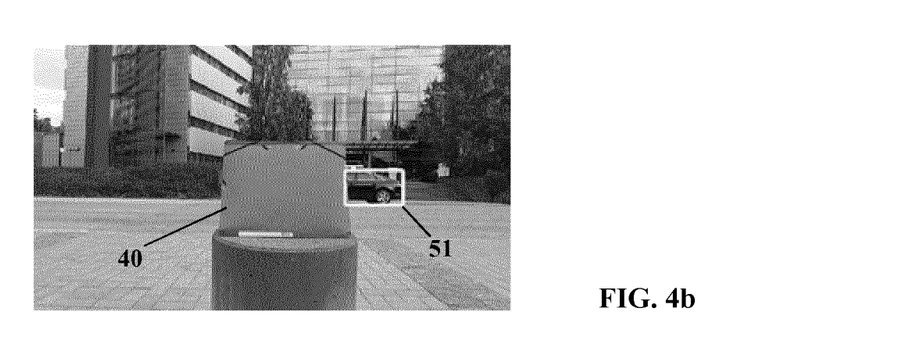
Figure 4C:
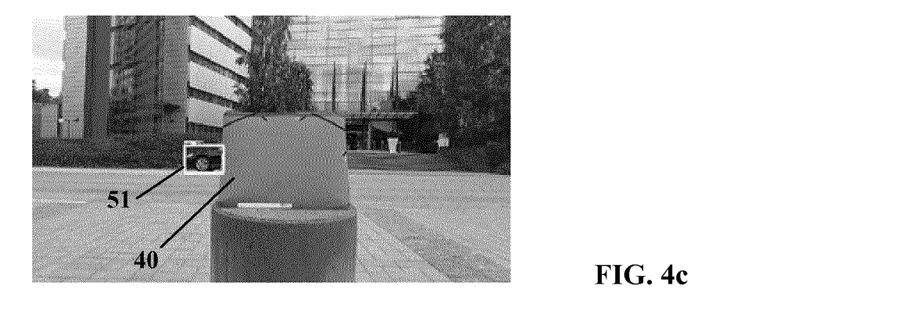

FIGS. 4a, 4b, 4c show a practical example of such rules, in a real-live scene wherein a car 50 runs from the right to the left, at three different dates of a sequence. The car is completely visible on FIG. 4a, and the bounding box 51 is a rectangle encapsulating the whole shape of the car. In FIG. 4b, the car has moved behind the obstacle 40. The surface area of the bounding box 51 has reduced, and its aspect ratio has changed. On FIG. 4c, the car begins to reappear on the other side of the obstacle 40.

Figure 5A:
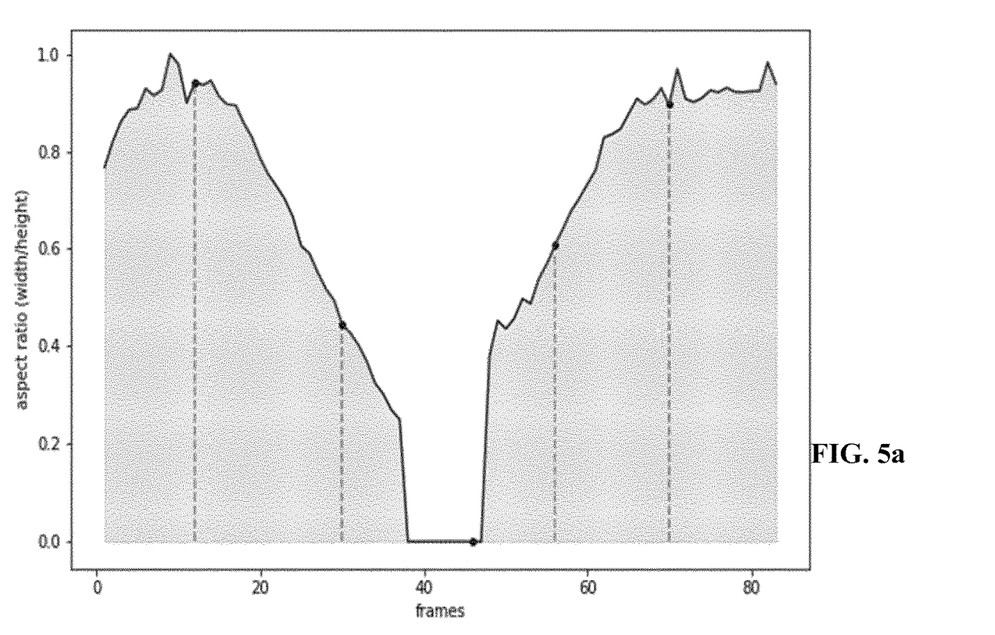
FIGS. 5a, 5b show respectively the evolution of the surface area and of the aspect ratio of a bounding box 51 along the time, according to embodiments of the invention.
Figure 5B:
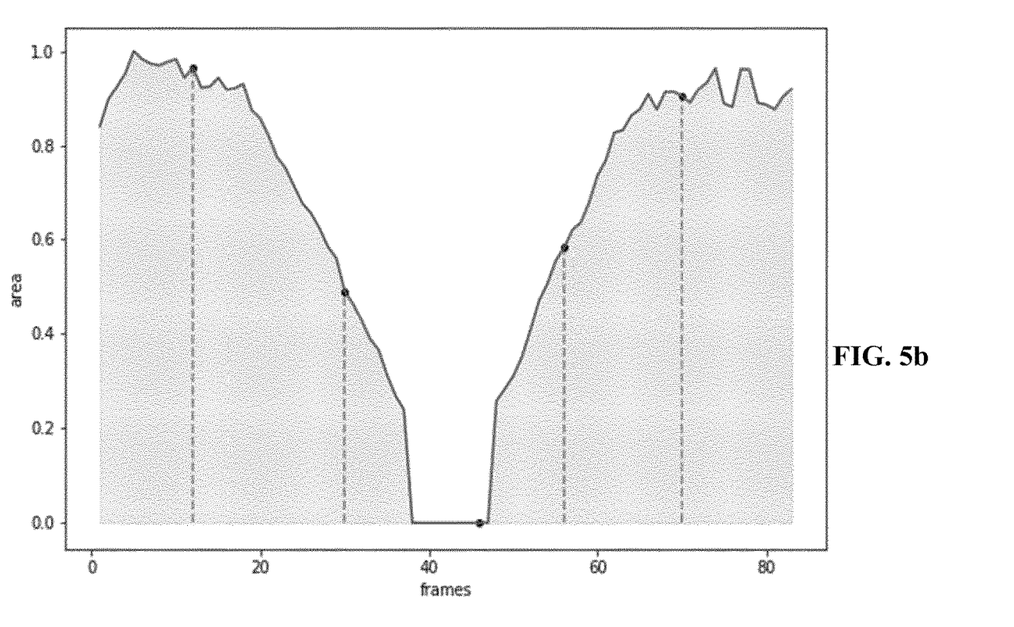

FIGS. 5a and 5b show respectively the evolution of the surface area and of the aspect ratio (width/height) of the bounding box 51 along the time.

The aspect ratio property enables to discriminate between an object moving behind an obstacle, and an object moving away from the camera along its optical axis. In this latter case, the surface area may reduce, as if it would move behind an obstacle, but it would remain visible. However, in both cases, the behavior of the aspect ratio will not be similar.

Also, the change of direction of the object's trajectory would affect its aspect ratio. However, the effect would be comparatively slow compared with the situation where it becomes hidden by an obstacle. Accordingly, the setting of a proper threshold may suffice for discriminating with these 2 situations.

An example algorithm can be as below:

```
def adapt_transmission_power(users, scene, previous_scene) {
    for device in users {
        bb_now=scene(device) # bounding box at current time instant
        bb_prev=previous(device) # bounding box at previous time instant
        dA==bb_now.height*bb_now.width/(bb_prev.height*bb_prev.width)
        if abs(bb_now.aspect_ratio-bb_prev.aspect_ratio) > ratio_threshold {
            if dA>speed_threshold
                increase_transmission_power
            else if 1/dA>speed_threshold
                decrease_transmission_power
        }
    }
}
```

An advantage of such embodiments of the invention is that machine learning algorithms can be directly imported from any existing object detection algorithm. The changes in the bounding boxes can be processed with a simpler algorithm and fine-tuned separately. The method is also versatile since it adapts well to different situations.

The pseudocode here-above shows a very simplified algorithm for the bounding box method, but more sophisticated algorithms can be designed.

In particular, the processing means can store the initial size of the object right before it starts to get obscured (i.e. its maximal size) and rely on the reasonable assumption that the antenna is in the middle of the vehicle, triggering the next step S4 of adaptation of the radio connection serving the device associated with this object, when, for example, the middle of the vehicle is going to be obstructed within x milliseconds, assuming the speed is constant. Such an embodiment would increase the temporal accuracy and reduce the amount of false alarms further.

More generally, embodiments of the invention may deduce a probable trajectory of the object from a succession of dated images of the geographical zone, and predict a time at which the radio operation may be impacted. This prediction may then trigger the adaptation of the radio connection at a predetermined offset before this time.

According to embodiments of the invention, the processing means can be configured to locate an antenna within the object 50. Such antenna can be assumed to correspond to a potential device 30.

It is possible to locate an antenna by knowing the type of object identified in the dated image, like "car", "pedestrian", etc. Various algorithms can be used for helping the identification of the type of object and consequently the location of the antenna inside the object, e.g. machine learning algorithms and/or template matching algorithms, etc.

Then, instead of considering the line of sights between the antenna system 11 and the device 30, a refined embodiment may consider the line of sight between the antenna system 11 and the located antenna for the object 50. For instance, a property representative of the visibility of the antenna can be determined, in addition or in lieu of the visibility of the object, so as to provide a more accurate heuristic of the radio transmission between the base station and the device corresponding to this antenna.

The visibility means here that the area corresponding to this antenna is visible in the dated image (and not obscured by another object). It does not mean that the antenna is actually depicted on the image, as depending on the image parameters (resolution, focal distance . . . ) and on the distance of the object to the detecting means, this antenna may be too small to be depicted or at least recognizable.

Also, it may be possible to combine both a visibility of the object (e.g. surface area and aspect ratio) and the visibility of the antenna to get a more robust property on which the control means may trigger the adaptation of the radio connection.

The control means 62 may be triggered for them to adapt, step S4, the radio connection serving the device 30 corresponding to the object 50. This step S4 may be embodied by a first sub-step S41 comprising the decision on the adaptation of the radio connection, and a second sub-step S42 comprising the actual adaptation of the radio connection according to this decision.

Adapting the radio connection may comprise the selection of one option among a set comprising, notably:
adapting the radio power of the base station 10 for transmitting the radio signal,
adapting the coding rate,
adapting the modulation order,
initiating a handover for said device to another base station or
to a device-to-device communication link,
resorting proactively to blind retransmission, etc.

A combination of these actions may be selected, like adapting both the transmit power and the modulation, or both the transmit power and the coding rate, or any other meaningful combinations.

For instance, when the adaptation aims at avoiding a risk of radio link failure, the radio power may be increased, the coding rate may be increased, the modulation order may be decreased or a handover or a resort to blind retransmission may be triggered . . . .

When the adaptation aims at reducing the power consumption, when the line of sight is recovered, the transmit power may be reduced, the coding rate may be reduced, the modulation order may be increased . . . .

According to embodiments of the invention, one or several such options may be available to the control means 62. For instance, according to some embodiments the control means 62 may only command the base station according to a reduced set of possible options, including a single one like adapting the transmit power.

Increasing the radio power may be the most obvious option in most of the cases, but in certain situations, a hand-over may be initiated. It may for instance be the case when a device is determined as moving out of the geographical zone, either by moving out of the right or left borderline, or shrinking in size (i.e. moving far).

The detecting means may also be used to approximate the quality of a radio connection between two devices. Then an option may be to trigger a D2D, device to device, radio connection if the estimated quality is above a certain threshold.

An example use-case may be an automated cargo harbor. The cranes that carry the containers require URLLC links, since loss of connection would result in an emergency stop, which are costly and may even damage the cranes. In many occasions, sudden changes in radio conditions will be the result of a LOS (line-of-sight) to NLOS (non-line-of-sight) transition: typically, a crane driving behind another crane or a pile of containers. To evaluate the loss in signal power due to such an event, a model has been designed by the inventors. Using this model, it has been observed that the path loss is increased by as much as 4-5 dB at the instant when a receiver enters into the radio shadow of an obstacle (like a metal container).

In this example, the camera can be used to recognize when this imminent reduction in signal power is about to happen, i.e. when it no longer sees the crane fully, but only partially. Link power can then be automatically increased, allowing for a more reliable connection.

Reactive legacy power control solutions should therefore maintain at least 4-5 dB higher transmit power, assuming that the legacy power control algorithms have no time to react to the sudden path loss increase associated with a LOS to NLOS transition. As a result, using the video feed as described can reduce the transmit power consumption as much as 70% during LOS propagation conditions.

It will be appreciated that the functions depicted and described herein may be implemented in software (e.g., via implementation of software on one or more processors, for executing on a general purpose computer (e.g., via execution by one or more processors) so as to implement a special purpose computer, or the like) and/or may be implemented in hardware (e.g., using a general purpose computer, one or more application specific integrated circuits (ASIC), and/or any other hardware equivalents).

A further embodiment is a computer program product comprising a computer readable storage medium having computer readable program code embodied therein, the computer readable program code being configured to implement one of the above methods when being loaded on a computer, a processor, or a programmable hardware component. In some embodiments, the computer readable storage medium is non-transitory.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

The invention claimed is:

1. An apparatus for a base station comprising an antenna system for transmitting a radio signal with a device located in a beam associated with the antenna system, the apparatus comprising:
at least one processor; and
at least one memory storing instructions that, when executed by the at least one processor, cause the apparatus to:
capture one or more dated images of a geographical zone at least partly covering the beam, each with a time stamp;
determine a potential occlusion based on at least an object corresponding to the device within the one or more dated images;
determine that the object is not obstructed by the potential occlusion;
predict a probable trajectory of the object and a property indicating a probable time at which the object would become obstructed; and
adapt a radio connection serving the device, according to the predicting, including adapt the radio connection at a predetermined offset before the probable time at which the object would become obstructed.

2. The apparatus according to claim 1, further comprising at least one video camera capturing a video sequence comprising the one or more dated images.

3. The apparatus according to claim 1, further comprising a detector configured to capture a sequence of one or more dated thermal images.

4. The apparatus according to claim 1, further comprising a plurality of cameras, wherein a camera of the plurality of cameras is associated to each antenna of the antenna system, and wherein each of the cameras is placed and oriented so that the plurality of cameras together cover the geographical zone.

5. The apparatus according to claim 1, further configured to determine the potential occlusion by detecting a correlation in time between an appearance of the object into the geographical zone and a handover of the device to the base station.

6. The apparatus according to claim 1, further configured to:
determine an area of the object corresponding to an antenna within the object; and
wherein the apparatus caused to determine that the object is not obstructed by the potential occlusion comprises the apparatus caused to determine that the area of the object corresponding to the antenna is not obstructed by the potential occlusion.

7. The apparatus according to claim 1, wherein the apparatus being configured to adapt comprises the apparatus configured to:
compare at least one property of the object between a dated image and a previously-captured dated image; and
adapt the radio connection according to the comparison.

8. The apparatus according to claim 1, further configured to:
determine a bounding box encapsulating the object; and
determine at least a part of the at least one property on the basis of the bounding box.

9. The apparatus according to claim 8, further configured to determine the at least one property among a surface area and an aspect ratio of the bounding box.

10. The apparatus according to claim 1, wherein the apparatus configured to adapt the radio connection comprises the apparatus configured to adapt the radio connection based on at least one of:
a radio power of the base station for transmitting the radio signal;
a coding rate;
a modulation order of transmitted data packets;
initiating a handover for the device to another base station or to a device-to-device communication link; and/or
proactively performing a blind retransmission.

11. The apparatus according to claim 1, further configured to determine a property representative of a visibility of the object in the one or more dated images.

12. The apparatus according to claim 1, and further comprising a camera configured to capture the one or more dated images of the geographical zone at least partly covering the beam and to transmit the one or more dated images to the base station.

13. The apparatus of claim 1, further configured to cause the apparatus to:
determine an area of the object corresponding to an antenna within the object; and
wherein the apparatus caused to determine that the object is not obstructed by the potential occlusion comprises the apparatus caused to determine that the area of the object corresponding to the antenna is not obstructed by the potential occlusion; and
wherein the apparatus caused to predict the probable trajectory of the object and a property indicating a probable time at which the object would become obstructed comprises the apparatus caused to predict a probable trajectory of the object and a property indicating a probable time at which the area of the object corresponding to the antenna would become obstructed.

14. The method of claim 13, wherein the apparatus caused to adapt the radio connection serving the device comprises the apparatus caused to:
adapt the radio connection serving the device, according to the predicting, including adapt the radio connection at a predetermined offset before the probable time at which the area of the object corresponding to the antenna would become obstructed.

15. A base station comprising an antenna system for transmitting a radio signal with a device located in a beam associated with the antenna system, the base station comprising:
at least one processor; and
at least one memory storing instructions that, when executed by the at least one processor, cause the base station to:
receive one or more dated images of a geographical zone at least partly covering the beam;

determine a potential occlusion on at least an object corresponding to the device within the one or more dated images;

determine that an area of the object corresponding to an antenna within the object is not obstructed by the potential occlusion;

predict a probable trajectory of the object and a property indicating a probable time at which the area of the object corresponding to the antenna would become obstructed; and adapt a radio connection serving the device, according to the predicting, including adapt the radio connection at a predetermined offset before the probable time.

16. A method of controlling a base station that includes an antenna system for transmitting a radio signal with a device located in a beam associated with the antenna system, the method comprising:

capturing one or more dated images of a geographical zone at least partly covering the beam, each with a time stamp;

determining a potential occlusion based on at least an object corresponding to the device within the one or more dated images;

determine that an area of the object corresponding to an antenna within the object is not obstructed by the potential occlusion;

predicting a probable trajectory of the object and a property indicating a probable time at which the object would become obstructed; and adapting a radio connection serving the device, according to the predicting, including adapt the radio connection at a predetermined offset before the probable time at which the object would become obstructed.

17. The method according to claim 16, wherein the potential occlusion is determined by detecting a correlation in time between an appearance of the object in the geographical zone and a handover of the device to the base station.

18. The method according to claim 16, comprising:

determining an area of the object corresponding to an antenna within the object; and wherein the determining that the object is not obstructed by the potential occlusion comprises determining that the area of the object corresponding to the antenna is not obstructed by the potential occlusion.

19. The method according to claim 16, wherein the determining properties comprises determining a bounding box encapsulating the object; and of at least a part of the properties on the basis of the bounding box.

20. A non-transitory computer-readable storage medium comprising instructions stored thereon that, when executed by at least one processor, are configured to cause a computing system to perform the method according to claim 16.

* * * * *